May 16, 1933.  H. A. DOUGLAS  1,909,665
HANDLE AND MOUNTING STRUCTURE
Filed Aug. 8, 1930
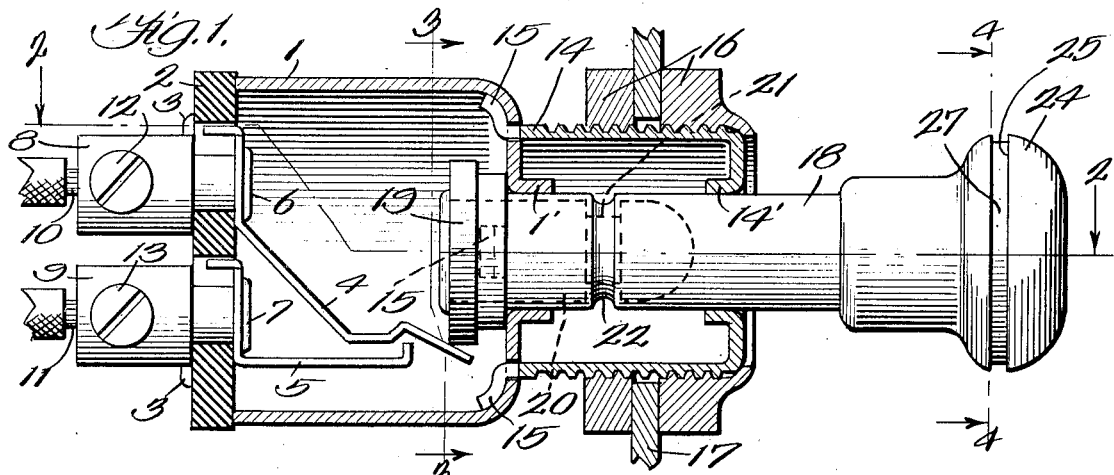
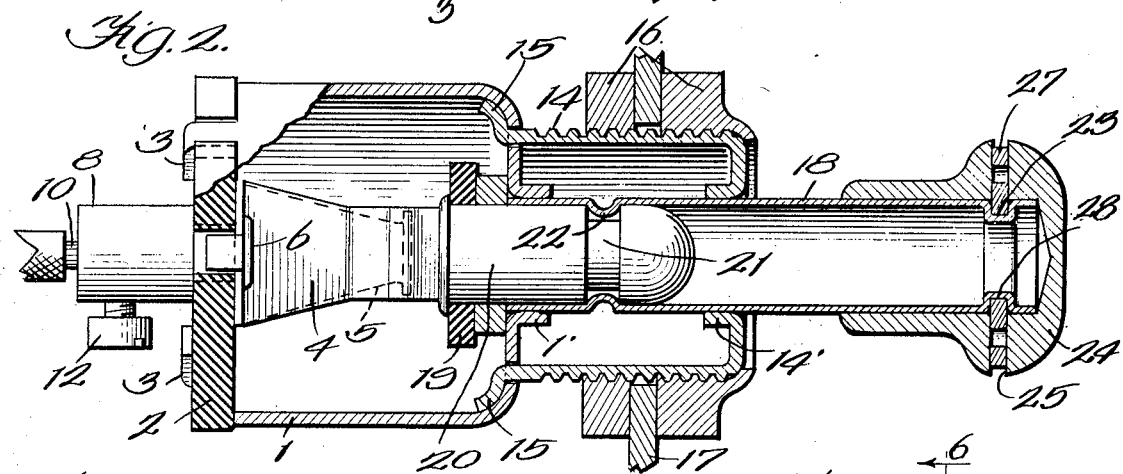
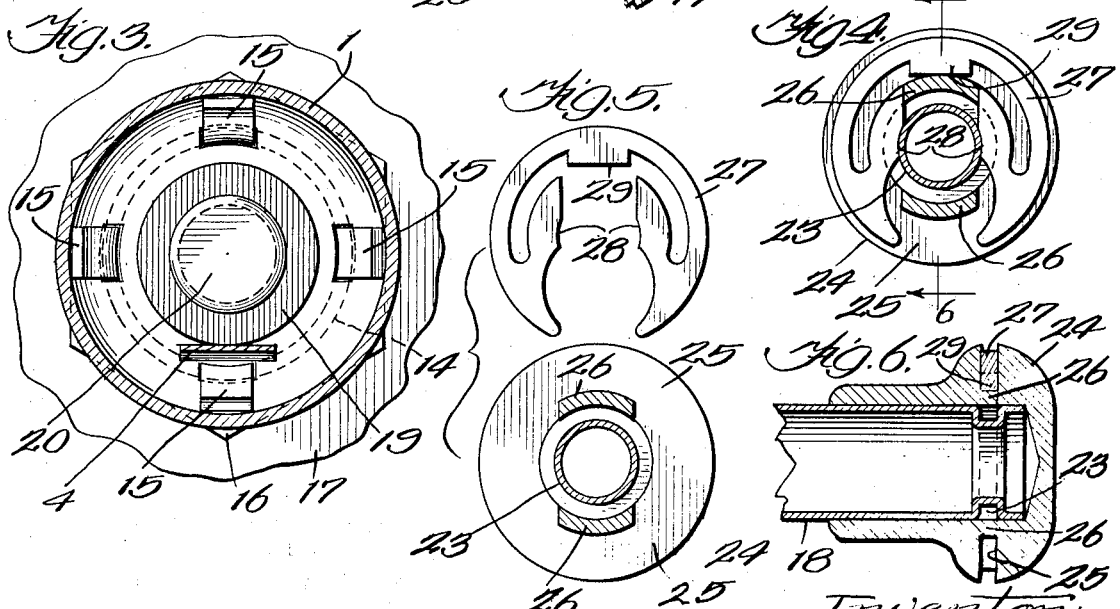
Inventor:
Harry A. Douglas
By G. L. Cragg  Atty.

Patented May 16, 1933

1,909,665

UNITED STATES PATENT OFFICE

HARRY A. DOUGLAS, OF BRONSON, MICHIGAN

HANDLE AND MOUNTING STRUCTURE

Application filed August 8, 1930. Serial No. 473,801.

My invention relates to handles and mountings being desirably of service in guiding the handles in reciprocable movements, but the mounting is not to be limited to this purpose. The mounting of my invention is employed in conjunction with the casing which may, for example, house switching mechanism. This casing has an end wall formed with a perforation for receiving a handle or other reciprocating element. I provide a second casing in suitable assembly with the first and having an end wall that is formed with a perforation, this end wall being remote from the other end wall and the rim of the perforation therein cooperating with the rim of the other perforation in guiding a reciprocable element passing through said perforations.

In accordance with another characteristic of the invention I provide a handle structure which is inclusive of a tubular member and a plug projecting into one end of said tubular member, said tubular member and plug having interfitting formations obstructing withdrawal of the plug. The portion of the plug within the tubular member is desirably in the form of an angular groove and the engaging portion on the tubular member is desirably an annular ridge snugly received in said groove.

In accordance with another characteristic of the invention I provide a lateral groove in a handle shaft, a knob formed with a bore receiving said shaft and a key in the knob that is slidable in said groove, whereby the handle shaft and knob are assembled. This construction enables the separate formation of the handle knob and handle shaft and their subsequent ready assembly.

The invention will be more fully explained in connection with the accompanying drawing in which Fig. 1 is a longitudinal sectional view illustrating the preferred embodiment of the invention, parts being shown in elevation; Fig. 2 is a sectional view on line 2—2 of Fig. 1; Fig. 3 is a sectional view on line 3—3 of Fig. 1; Fig. 4 is a sectional view on line 4—4 of Fig. 1; Fig. 5 shows the parts appearing in Fig. 4 in separated relation; and Fig. 6 is a sectional view on line 6—6 of Fig. 4.

The casing illustrated includes a cup shaped metallic member 1 having a closure wall 2 which is gripped in place by means of prongs 3 upon the casing part 1. This casing encloses two complemental contacts 4 and 5 which are respectively clamped between the flanges 6 and 7 upon the metallic sleeves 8 and 9. The wall 2 snugly surrounds reduced portions of said sleeves and is clamped against larger portions of these sleeves by the aforesaid flanges. Circuit conductors 10 and 11 enter the sleeves 8 and 9 and are clamped in engagement therewith by the binding screws 12 and 13.

A second cup shaped casing 14 is assembled with part 1 of the previously described casing, the second casing being desirably formed with tongues 15 which pass through the contiguous end wall of the casing part 1 and are clinched into engagement therewith. The casing 14 is exteriorly threaded in order to receive clamping nuts 16 between which the mounting 17 is clamped. The end walls of the cup shaped parts of the two casings are provided with aligned central openings and sleeve continuations 1' and 14' margining these openings. The handle shaft 18 passes through said aligned openings and the sleeves 1' and 14' that cooperate to guide the handle in its reciprocable movements. The inner end of the handle carries a contact actuator 19 which is preferably in the form of an insulating disc. This contact actuator is engageable with the sloping end of a contact member 4. When the handle is inwardly pushed the actuator depresses the contact member 4 into engagement with the contact member 5 to close the circuit.

The handle structure illustrated includes the shaft portion 18 of tubular formation and a plug 20 which is received within the bore of the handle part 18. The portion of the plug within the tubular member is formed of an annular groove 21 and the tubular member, itself, is formed with an annular ridge 22 which may be snugly spunned into the groove, whereby withdrawal of the plug is guarded against.

In accordance with another characteristic of the invention the shaft of the handle is formed with an annular groove 23 which is surrounded by a handle knob 24. This handle knob is provided with an annular groove 25 whose sides are joined by the binding portions 26 of the knob that remain intact. A key 27 is receivable within the grooves 23 and 25 for the purpose of securely assembling the knob and shaft of the handle. The key 27 is desirably of spring metal and is bifurcated, the two sides of the key snugly gripping the handle shaft therebetween. Arcuate seats 28 are provided for the handle shaft that is snugly received therein to prevent accidental withdrawal of the key. A tongue 29 limits the extent to which the key may be slipped in position and defines the location of said arcuate seats with respect to the shaft.

Changes may be made without departing from the invention.

Having thus described my invention, I claim:

1. The combination of a cup-shaped casing having an end wall formed with a central perforation, said perforation being margined by a sleeve continuation of the casing directed outwardly thereof; slots in the end wall of the casing; a second cup-shaped casing having tongues passing through said slots and clinched on the inner surface of said wall to assemble the second casing with the first, said second casing being exteriorly threaded on its cylindrical surface; a central perforation in the end wall of the second casing aligned with the perforation in the first casing, said central perforation in the second casing being also margined by a sleeve continuation of the second casing directed inwardly thereof; and a handle in the bearings, said handle having abutments at each end engageable with the end walls of the casings to limit movement of the handle therein, whereby said sleeve continuations form oppositely directed aligned bearings both projected inwardly of the second casing and the abutments of the handle are maintained out of contact with the bearings.

2. The combination with a cup-shaped cylindrical casing having a closed end and an open end; of an insulating closure for the open end carried by the casing; complemental contacts carried by the closure, one of said contacts being movable; an integral end wall closing the closed end of the casing; a second cup-shaped cylindrical casing having a closed end and an open end, said second casing being of smaller diameter than the first casing; slots in the end of the first casing; circumferentially disposed tongues on the open end of the second casing passing through the end wall of the first casing and clinched upon the inner surface thereof to secure the casings together; an integral end wall for the closed end of the second casing; aligned circular central openings in the end walls of both casings; a tubular handle reciprocable in the casings, said handle passing through the aligned openings; a cylindrical sleeve continuation on each end wall margining each opening and providing spaced apart bearings for the handle, the sleeve continuations being oppositely directed and being projected into the interior of the second casing; abutments at each end of the handle limiting reciprocation thereof in the casings, one of said abutments embodying an insulating disc and said disc in one reciprocable position of the handle actuating the movable contact into engagement with the other contact; and screw threads on the exterior of the second casing whereby the whole may be mounted.

In witness whereof, I hereunto subscribe my name.

HARRY A. DOUGLAS.